United States Patent [19]

Poffenberger

[11] 4,261,131
[45] Apr. 14, 1981

[54] PORTABLE LIVE BAIT CONTAINER

[76] Inventor: Daniel Poffenberger, 306 E. Luhn, Bellville, Tex. 77418

[21] Appl. No.: 67,946

[22] Filed: Aug. 20, 1979

[51] Int. Cl.³ .............................................. A01K 97/04
[52] U.S. Cl. ...................................................... 43/57
[58] Field of Search ................... 43/56, 57, 55, 54.5 R; 261/121 M

[56] References Cited

U.S. PATENT DOCUMENTS

| | | | |
|---|---|---|---|
| 2,564,598 | 8/1951 | Grimshaw | 43/56 |
| 2,689,427 | 9/1954 | Piker | 43/56 |
| 3,323,249 | 6/1967 | Randall | 261/121 M |
| 3,333,834 | 8/1967 | Brewster | 43/57 |
| 4,040,200 | 8/1977 | Tomita | 43/57 |

FOREIGN PATENT DOCUMENTS 530387  9/1956  Canada ........................... 43/57

OTHER PUBLICATIONS

Popular Mechanics, "Personal Bait Bucket", Mar., 1949, p. 178.

*Primary Examiner*—Nicholas P. Godici
*Attorney, Agent, or Firm*—Guy E. Matthews

[57] ABSTRACT

A live bait container that is adapted to float in water with a majority of the container in submerged condition and which is also adapted to maintain fishing bait in live condition when removed from the water. The structure of the container promotes internal circulation of water when floating and retention of a substantial volume of water to keep the bait alive when the container is removed from the water. A valve at the bottom of the container, an aeration tube and air supply cooperate to provide bait preserving water circulation and aeration while in and out of the water.

13 Claims, 5 Drawing Figures

PORTABLE LIVE BAIT CONTAINER

FIELD OF THE INVENTION

This invention relates generally to containers that are adapted to contain live bait utilized for fishing and the like and more particularly relates to a container structure that enables effective utilization of live bait container either in floating condition within the water or out of the water. Even more particularly, this invention relates to a portable live bait container that may be filled with water simply by lowering the container into the water and retains a portion of the water thereof upon lifing the container from the water and a system for aeration of the water so as to keep the live bait therein alive and active for extended periods of time.

BACKGROUND OF THE INVENTION

In the sport of fishing it is often desirable to provide live bait such as minnows, shrimp, small fish and the like that may be placed onto a fishing hook in live condition in order to be more attractive to certain types of fish being sought. Whether fishing is done adjacent the shore of a body of water or on portions of the body of water that are accessible only by boat, it is frequently desirable to move from place to place in order to discover more optimum fishing conditions or to fish at different locations. For this reason, it is desirable when a live bait is being used to ensure that the live bait is maintained in an active and preserved condition while the fisherman is moving from place to place. Frequently, live bait is lowered into the water by means of suitable bait containing enclosures in order that the bait may remain alive during fishing operations. During movement, it is sometimes necessary to transfer the bait to a water containing vessel or container that is adapted with appropriate aeration equipment in order to inject bubbles of air into the water and thus maintain the liveliness of the bait for extended periods of time.

A number of different live bait containers have been developed that have the ability to maintain bait in live condition while partially submerged in the water and yet have the facility for aeration of water within the container after the container has been removed from the water for transportation to another location. For example, U.S. Pat. No. 3,348,330 of Gilliam illustrates a minnow bucket structure that is provided with an aeration system. U.S. Pat. No. 3,711,986 of Anderson shows a pair of nesting buckets that are coordinated in such manner as to achieve aeration of the water therein. U.S. Pat. No. 4,040,200 of Tomita also illustrates a portable container for fish, live bait and the like that is adapted to provide aeration for the water within the container.

Certain types of live bait containers have been developed having an imperforate outer bucket that is capable of containing water and a perforated inner container or chamber that may be removed from the outer bucket. When the bait is to be placed in the water, the inner bucket is removed and simply submerged or placed into the water. In some cases the inner container is enabled to float separately from the outer container. When it is desired to transport the bait from place to place, the inner container is inserted into the outer container and a quantity of water is maintained in the outer container. For aeration purposes, the inner container may be raised and lowered, causing water and air to be circulated as water is forced through the perforated walls of the inner container. Although live bait may be maintained for a period of time in a bait containing system of this nature, it is nevertheless desirable for extending periods to provide a system for continuously aerating the water within the container by means of an air injection system such as that set forth in U.S. Pat. No. 4,040,200. Furthermore, double bait containers of this nature are not entirely satisfactory because the inner or outer containers may become bent or mishapened to the point that they will not fit together properly. It is desirable therefore to provide a live bait container system that employs only a single container and therefore does not have the problems ordinarily associated with multiple containers.

It is therefore a primary feature of the present invention to provide a novel portable live bait container that incorporates a single container structure that may be used effectively either in partially submerged condition within the water or completely removed from the water.

It is also a feature of this invention to provide a novel portable live bait container that is capable of incorporating an aeration system for forced air aeration of the water within the container in order to maintain the bait in a lively condition for extended periods of time.

It is also an important feature of this invention to provide a novel portable live bait container structure wherein an appropriate quantity of water is automatically maintained within the container under circumstances where the container is lifted from the water for transportation elsewhere.

It is an even further feature of this invention to provide a novel portable live bait container mechanism that may be filled with water simply by lowering the container to the body of water and which, upon raising the container from the body of water, will trap a quantity of water therein in order to maintain bait within the container in a lively condition.

It is an even further feature of this invention to provide a novel portable live bait container structure that enables water within the container to be changed out simply and quickly without any detrimental effect to the live bait contained therein.

It is also an important feature of this invention to provide a novel portable live bait container mechanism that is of simple nature, is reliable in use and low in cost.

Other and further objects advantages and features of this invention will become obvious to one skilled in the art upon an understanding of the illustrative embodiments about to be described and various advantages, not referred to herein, will occure to one skilled in the art upon employment of the invention in practice.

SUMMARY OF THE INVENTION

The present invention is directed to the provision of a portable live bait container that is adapted to be partially submerged in water and to allow efficient circulation of water within the container for the purpose of maintaining bait therein in a lively and active condition for extended periods of time. Upon lifting of the container from the body of water the mechanism of the portable live bait container will function at such manner as to trap a suitable quantity of water within the container in order that the live bait may be transported from place to place without any detrimental effect. The live bait container mechanism also incorporates an aeration system that allows air from a portable air supply system to be injected into the water of the container in such manner that an optimum quantitiy of oxygen will be continuously introduced into the water in order to preserve the lively condition of the bait contained therein.

The portable live bait container generally comprises a unitary container structure having a cover structure connectable thereto, which cover structure defines a stationary cover portion and a cover portion that functions as a door through which bait is inserted into and taken from the container. The upper portion of the container is perforated so as to allow efficient circulation of water through the container when the container is in partially submerged condition. A floatation element is attached to the underside of the cover structure and provides sufficient buoyancy capability that the portable container will float with its upper extremity just above the level of the water within which it is partially submerged. In such partially submerged condition, the perforations at the upper portion of the container will be below the level of the water, allowing effective water circulation in the container.

The lower portion of the container structure is formed in such manner as to define a water inlet and to define a valve seat about the water inlet. A valve element is positioned within the lower portion of the container and is adapted to seat against the valve seat and prevent water from escaping from the water inlet when the container is lifted from the body of water. The valve functions as a check valve to allow introduction of water through the bottom of the container as the container is simply lowered into the water.

In order to provide for aeration of the water under conditions where the portable bait container has been removed from the water, a tubular element extends through the fixed cover portion of the container and defines a lower perforated portion that is positioned at the lower portion of the container. An air injection tube extends through the tubular element with the lower extremity thereof terminating at the perforated portion of the tubular element and with the upper extremity thereof projecting from the tubular element and adapted for connection to the air supply hose of a portable pump or other air supply system. The internal air supply tube is sealed with respect to the tubular element by a lower seal that is positioned immediately above the perforated portion of the tubular element and by an upper sealing element that is positioned near the upper extremity of the tubular element. As air is forced through the inner air supply tube of the tubular element it exits into the container from the lower perforated portion of the tubular element in the form of a multitude of small air bubbles that efficiently introduce oxygen into the water in order to maintain the vitality of the bait contained therein.

BRIEF DESCRIPTION OF THE DRAWINGS

In order that the manner in which the above recited advantages and objects of this invention are attained and can be understood in detail, more particular description of the invention, briefly summarized above, my be had by reference to the specific embodiments thereof that are illustrated in the appended drawings, which drawings form a part of this specification. It is to be understood however that the appended drawings illustrate only typical embodiments of this invention and therefore are not to be considered limiting of its scope, for the invention may admit to other equally effective embodiments.

In the Drawings.

DESCRIPTION OF PREFERRED EMBODIMENTS

Figure 1:
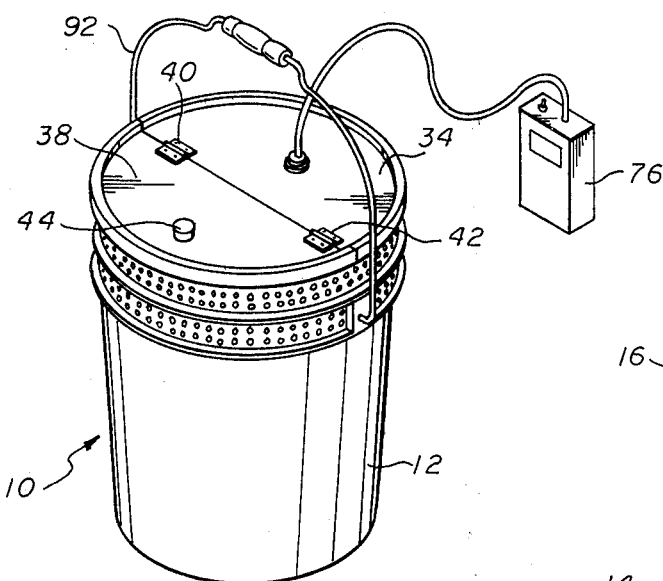
FIG. 1 is an isometric view of a portable live bait container mechanism that is constructed in accordance with the present invention and illustrates a portable air supply being connected thereto.
Figure 4:
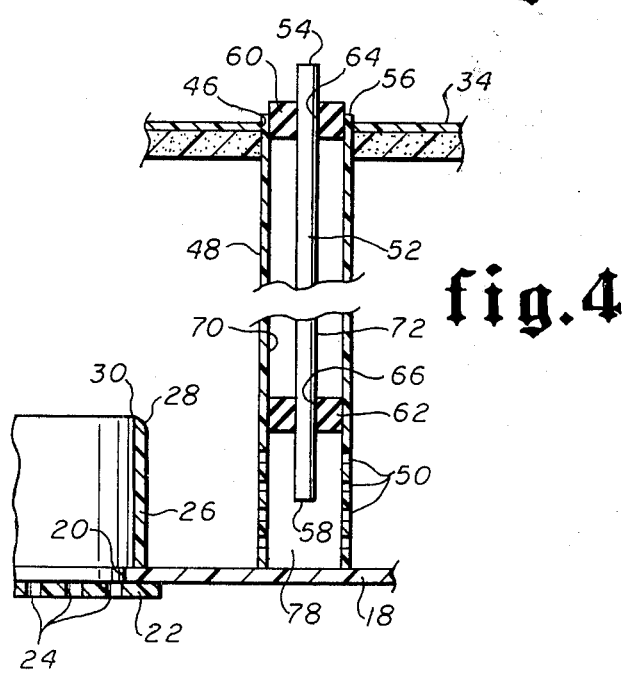
FIG. 4 is a fragmentary partial sectional view illustrating the tubular aeration air supply system of the portable live bait container of FIGS. 1 and 2.

Referring now to the drawings and first to FIG. 1 there is illustrated a portable live bait container mechanism generally at 10 which incorporates a container structure shown generally at 12 having sidewall structure 14 defining an upper container rim 16 and a bottom wall 18 that may if desired be formed integrally with the sidewall structure. The sidewall structure is shown in the drawings as being of generally frusto-conical configuration but this particular configuration is not intended to limit the present invention in any manner whatever. It is intended that the invention be effectively adaptable to containers of other configuration as well. As is evident from FIGS. 2 and 4, the bottom wall 18 is formed to define a water inlet opening 20 which is covered by means of a plate structure 22 having a plurality of water inlet apertures 24 formed therein. The plate 22 may be formed of any suitable material and may be assembled to the lower portion of the bottom wall 18 in any suitable matter. For example, the bottom wall 18 as well as the sidewall structure 14 of the container 12 may be formed of a suitable plastic material. The plate structure 22 may also be formed of plastic material and may be connected to the bottom wall 18 by any suitable adhesive. Likewise the plate structure 22 may be formed of a metal material that may be bonded or otherwise secured to the lower wall 18 of the container in any suitable manner.

A relatively short generally cylindrical wall structure 26 may be fixed to the inner surface of the bottom wall 18 by means of adhesive or by any other suitable form of connection and may be positioned about the water inlet opening 20 so that water being introduced in the container must flow through the circular valve tube 26. The upper portion of the valve tube is formed to define a valve seat surface 28 that may simply be a chamfered surface defining a rather sharp circular sealing edge 30. Although the structure 26 is shown to be of circular cross sectional configuration it is to be understood that it may be of other suitable configuration as well within the spirit and scope of the present invention. A check valve structure is employed to establish a seal about the annular seat surface 28 and will be discussed in detail hereinbelow in connection with other structure of the portable live bait container apparatus.

The container 10 is provided with a cover structure, illustrated generally at 32 in FIG. 1, which cover structure incorporates a fixed portion 34 that is secured to the rim portion 16 of the container. The fixed cover portion 34 is formed to define an arcuate rim receptacle portion 36 that receives the rim 16 in intimate secured engagement therewith. To the fixed cover portion 34 is secured a movable cover portion 38 that is connected to the cover portion of 34 by means of hinges 40 and 42. A lifting structure 44 is secured to the movable cover portion 38 and is adapted to be grasped by the user in order to raise and lower the movable cover structure or door for the purpose of introducing bait into the container and removing bait therefrom. The fixed cover structure 34 is formed to define an opening 46 through which may extend a tubular element 48 through which air is injected into the water of the container. As shown in detail in FIG. 4, the tubular element 48 extends from the fixed cover portion 34 to the bottom wall 18 of the container and may if desired be fixed to the bottom wall 18 by means of any suitable adhesive. The aperture 46 through which the upper extremity of the tubular element 48 extends provides efficient support for the tubular element by virtue of a close fitting relation therewith. The cover portion 34 is nevertheless removable from the upper rim portion 16 of the container without disturbing the tubular element 48.

Figure 2:
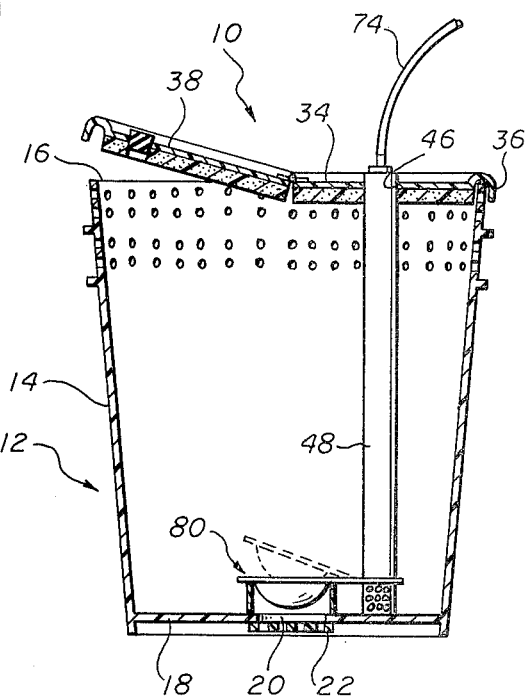
FIG. 2 is a partial sectional view of the live bait container mechanism of FIG. 1, illustrating the internl valve and aeration supply structure thereof in detail.

For the purpose of causing continuous aeration of the water within the container 12, the tubular element 48 is formed at the lower etremity thereof to define a perforate portion having a plurality of perforations 50 formed therein. An inner air supply tube 52 extends through the tubular element 48 with the upper extremity 54 thereof positioned slightly above the upper extremity 56 of the tubular element and with the lower extremity 58 thereof positioned at the perforate portion of the tubular element. Upper and lower sealing elements 60 and 62 are located within the tubular element 48 and are formed to define central apertures 64 and 66 respectively through which the air supply tube 52 extends. The sealing elements 60 and 62 may be formed of any suitable sealing material such as rubber or any other elastomeric substance that is capable of establishing a sealed relationship with both the internal surface 70 of the tubular element 48 and the external surface 72 of the air supply tube. As shown in FIGS. 1 and 2, an air supply hose 74, extending from a suitable air supply mechanism 76, may be interconnected with the upper extremity 54 of the air supply tube 52 and air compressed thereby will be injected through the tube 52 into an aeration compartment 78 defined below the level of the sealing element or plug 62. Thus air injected through the air supply tube 52 will be caused to flow out of the perforations 50 into the water surrounding the tubular element 48.

Figure 3:
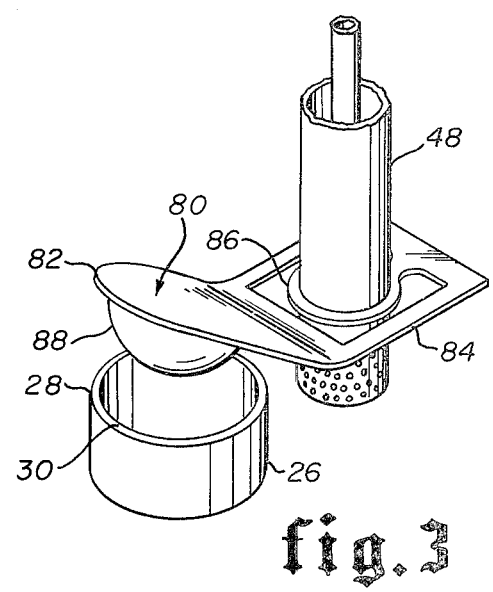
FIG. 3 is a fragmentary isometric view of the aeration air supply and valve mechanism of the portable live bait container of FIGS. 1 and 2.

As is evident from FIG. 2 and especially FIG. 3, a valve mechanism is illustrated generally at 80 and incorporates a generally flat valve element or plate 82 that is capable of moving into sealing engagement with the annular seat surface 28 and the annular sealing edge 30 defined at the upper extremity of the cylindrical element 26. The valve element 82 is formed integrally with an anchor portion 84 that defines a circular retaining portion 86 that is adapted to fit tightly about the tubular element 48 and thus secure the valve structure in place relative to the tubular element. If desired, an adhesive material may be also utilized in order to establish a firm interconnected relationship between the valve element and the tubular element. The valve mechanism is shown in FIG. 3 in the raised or open position thereof which occurs as water is flowing through the various apertures 24 of the plate 22 and through the opening 20 into the container. A weight 88 is secured to the lower surface of the flat valve element 82 and functions to urge the valve element toward the closed or sealed position thereof. The valve element is adapted to flex or to bend as it moves between the open and closed positions thereof.

As the container 12 is lowered into the water, water pressure acts upon the lower portion of the valve 80, causing the valve to unseat from the sealing surface 28 and sealing rim 30 and move toward the position illustrated in FIG. 3. Thus water is allowed to be introduced into the container 12 simply by lowering the container into the water. After becoming fully filled, the container will float with the upper cover portion thereof only slightly above the level of the water and efficient water circulation will occur to maintain the lively condition of the bait contained therein. When it is desired to move to a different area for fishing or to remove the container from the water for an extended period, the user simply grasps the bail 92 of the container and raises the container from the water. When this occurs, hydrostatic pressure acting upon the upper surface area of the valve 80 will cause the valve to be moved to the closed position thereof establishing sealing engagement with the angular sealing surface 28 and thus preventing water from flowing out of the container. The level of water maintained within the container will be slightly below or even with the lower perforations at the upper extremity of the container.

Figure 5:
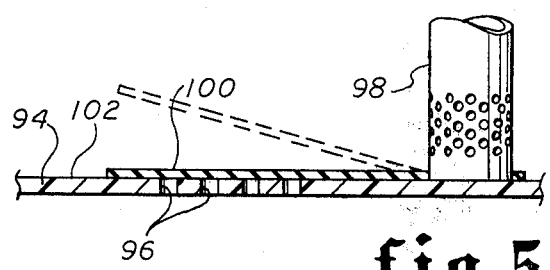
FIG. 5 is a fragmentary sectional view of a portable live bait container representing a modified embodiment of the present invention and showing a plate-like check valve element being incorporated therewith and operative to control the water inlet opening of the live bait container.

As shown in FIG. 5, an alternative embodiment of the present invention may conveniently take the form of a container having a bottom wall structure 94 that is formed to define a plurality of perforations 96 through which water may flow into the container when the container is lowered into the water in similar manner as discussed above. A tubular element 98 similar to that discussed above at 48 in FIG. 4 provides support for a flat valve 100 that is adapted to seal against the bottom surface 102 of the container in order to seal the perforation 96 against leakage of water from the container. The flat valve 100 will function in the same manner as the valve 80 discussed above in order to allow introduction of water into the container and prevent exit of water therefrom under circumstances when the container is out of the water.

It is therefore apparent that the present invention is one well adapted to attain all of the objects and advantages hereinabove set forth, together with other advantages which will become obvious and inherent from my description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. A live bait container adapted for sustaining bait while situated in water and while maintained out of the water, said container comprising:

a bottom wall having a plurality of water inlet apertures through which water enters said container;

side wall means extending upwardly from said bottom wall means and being formed to define lower imperforate portion and an upper perforate portion, said side wall means defining a rim;

cover means being secured to said rim and comprising a immovable portion adapted to be secured to said rim and a movable portion movably secured to said immovable portion and defining a door through which bait may be introduced into and removed from said container, said cover means including flotation means for causing said container to float with said cover exposed;

aeration means being positioned near said bottom wall and defining air inlet means through which air is injected into water contained within said container; and check valve means being provided within said container and adapted to allow entry of water through said water inlet apertures when said container is lowered into the water and adapted to seal said water inlet apertures when said container is lifted from the water to retain a quantity of water within said container.

2. A live bait container as recited in claim 1, including:

wall means surrounding said plurality of water inlet apertures and projecting into said container, said wall means defining valve seat means; and said check valve means adapted to establish sealing engagement with said valve seat means to prevent exit of water from said container through said water inlet upon lifting of said container from the water.

3. A live bait container as recited in claim 1, wherein said aeration means comprises:

a tubular element attached to and extending upwardly from said bottom wall and being formed to define said air inlet means at the lower portion thereof; and an air supply tube extending through said tubular element and adapted to conduct air to said air inlet means, said air supply tube adapted to selectively receive air in substantially continuous manner from a source of compressed air.

4. A live bait container as recited in claim 3, wherein:
the lower portion of said tubular element is formed to define a perforate portion through which air is injected into which within said container and defines an imperforate portion;

said air supply tube extends from the upper portion of said tubular element and terminates within said perforate portion of said tubular element; and seal means for establishing a seal between the imperforate portion of said tubular element and said air supply tube.

5. A live bait container as recited in claim 4, wherein said seal means comprises:

a lower seal positioned within said tubular element and immediately above said perforate portion of said tubular element; and an upper seal positioned within said tubular element and adjacent the upper extremity of said tubular element.

6. A live bait container as recited in claim 3, wherein:
said cover is formed to define an aeration opening; and the upper extremity of said tubular element extends through said aeration opening.

7. A live bait container as recited in claim 1, wherein said cover means comprises:

a fixed cover portion adapted to be received in fixed relation to said rim; and a movable cover portion being connected to said fixed cover portion and defining a door for said container.

8. A live bait container as recited in claim 7, wherein:
said fixed cover portion is formed to define an aeration opening; and the upper extremity of said tubular element extends through said aeration opening.

9. A live bait container as recited in claim 1, wherein:
said flotation means is attached to the inner surface of said cover means.

10. A live bait container as recited in claim 1, wherein said check valve means comprises:

a tubular valve seat element extending upwardly from said bottom wall and defining a valve seat surface at the upper portion thereof; and a valve element being positioned within said container and adapted to engage said valve seat surface to prevent flow of water from said container.

11. A live bait container as recited in claim 10, wherein:

a weight is secured to the under side of said valve element and urges said valve element toward the closed position thereof where said valve element is seated in sealing engagement with said seat surface, said valve element being unseated by the differential pressure of water acting thereon as said container is lowered into the water, sealing of said valve element being assisted in the closed position thereof by the hydrostatic pressure of water within said container when said container is removed from the water.

12. A live bait container as recited in claim 1, wherein:
said check valve means is a generally flat, yieldable sealing plate, a portion thereof being attached to said bottom wall adjacent to said plurality of water inlet apertures.

13. A live bait container as recited in claim 1, wherein:
said check valve means comprises a substantially flat flap valve being supported at one side thereof and being movable away from said apertures by water pressure upon inlet of water through said apertures and being movable into sealed relation with said valve seating surface by water pressure upon lifting said container from the water.

* * * * *